United States Patent [19]

Yoshida et al.

[11] 4,190,945
[45] Mar. 4, 1980

[54] METHOD OF MANUFACTURING SLIDE FASTENERS

[75] Inventors: Hiroshi Yoshida, Uozu; Shunji Akashi, Kurobe, both of Japan

[73] Assignee: Yoshida Kogyo K.K., Tokyo, Japan

[21] Appl. No.: 916,597

[22] Filed: Jun. 19, 1978

[30] Foreign Application Priority Data

Jun. 30, 1977 [JP] Japan ................................ 52/78278

[51] Int. Cl.² ............................................ B23P 11/00
[52] U.S. Cl. ...................................... 29/408; 29/33.2
[58] Field of Search ................ 29/33.2, 408, 409, 410, 29/766, 767, 768, 769

[56] References Cited

U.S. PATENT DOCUMENTS

| | | | |
|---|---|---|---|
| 2,219,165 | 10/1940 | Nedal | 29/408 |
| 3,190,779 | 6/1965 | Porepp | 29/408 X |
| 3,340,594 | 9/1967 | Frohlich et al. | 29/408 |
| 3,485,691 | 12/1969 | Waldes | 29/408 X |
| 4,074,413 | 2/1978 | Taccani | 29/408 |
| 4,110,890 | 9/1978 | Akashi | 29/408 |

Primary Examiner—Ervin M. Combs
Attorney, Agent, or Firm—Bucknam and Archer

[57] ABSTRACT

A pair of continuous slide fastener stringers having a pair of stringers tapes including thermoplastic synthetic fibers and a pair of integrated rows of fastener elements mounted on the confronting edges of the stringer tapes are provided with an element-free gap therein and are cut off transversely of the element-free gap to produce an individual slide fastener length with ultrasonic processing means. Simultaneously, the cut edges and ends are fused, and top and bottom end stops are mounted respectively on the fastener slide stringers and the slide fastener length with heat induced by the ultrasonic processing means. The interengaged element rows while advancing are introduced into a slider through its mouth which is supported on a slider holder, with portions of the top end stop being forcibly flexed away from each other by the body of the slider, thereby allowing the top end stop to move past the slider.

1 Claim, 5 Drawing Figures

METHOD OF MANUFACTURING SLIDE FASTENERS

BACKGROUND OF THE INVENTION

1. Field of the Invention

The present invention relates to a method of manufacturing individual slide fasteners from a pair of slide fastener stringers of continuous or substantially endless length.

2. Prior Art

As is well known in the art, slide fastener parts are assembled into individual slide fasteners through a number of distinct processing steps. A pair of rows of fastener elements are mounted respectively onto the confronting edges of a pair of slide fastener tapes, and the rows of fastener elements are interengaged or coupled together into a slide fastener chain. Then, element-free spaces or gaps are formed in the slide fastener stringers at predetermined intervals therealong, and the fastener stringers are severed thereacross centrally of the element-free gaps, followed by installation of a slider onto the slide fastener chain from the cut end of the stringers. Top and bottom end stops are finally attached to the fastener stringers to trap the slider thereon, thereby producing a slide fastener. Some of the steps involve additional processes to eliminate various inconveniences which could be developed in association with such steps. For example, the fastener elements located adjacent to the element-free gap should be fixed in place against loosening and the tape fabric at the cut edges should be free from reveling, both for neat finishing and smooth slider installation. Further, since the slide fastener chain normally passes through the slider from its mouth, the element rows become uncoupled when they emerge from the throats of the slider, and hence it is difficult to attach the top end stop halves to the separated stringers in exact alignment with each other.

Therefore, there have been required many independent processing machines, which jointly make it difficult to keep a high degree of quality control, and are liable to produce off-specification products due to finishing errors built up by such many machines. In addition, with prior machine arrangements, the rate of production is relatively low and the finished products become expensive.

SUMMARY OF THE INVENTION

According to the present invention, a pair of blank slide fastener stringers having a pair of stringer tapes including thermoplastic synthetic fibers are provided with an element-free gap and are severed to produce a unit slide fastener length with ultrasonic processing means. Simultaneously, the edges of the element-free gap and the cut ends of the fastener stringers and of the slide fastener length are fused, and top and bottom end stops are formed respectively on the cut end portions of the fastener stringers and of the unit slide fastener length with heat produced by the ultrasonic processing means. The coupled element rows are thereafter introduced into a slider through a mouth thereof while the stringers are being advanced with portions of the top end stop forced to flex away from each other by the body of the slider, thereby permitting the top end stop to move past the slider.

An object of the present invention is to provide a method of manufacturing slide fasteners which comprises centralized processing steps that can be carried out at one time.

Another object of the present invention is to provide a method of manufacturing slide fasteners which is relatively simple and can be effected on a single apparatus.

Still another object of the present invention is to provide a method of manufacturing slide fasteners of a good quality less costly and at a high rate of production.

The above and other objects, features and advantages of the present invention will become apparent from the following description when taken in conjunction with the accompanying drawings.

DETAILED DESCRIPTION

Figure 1:
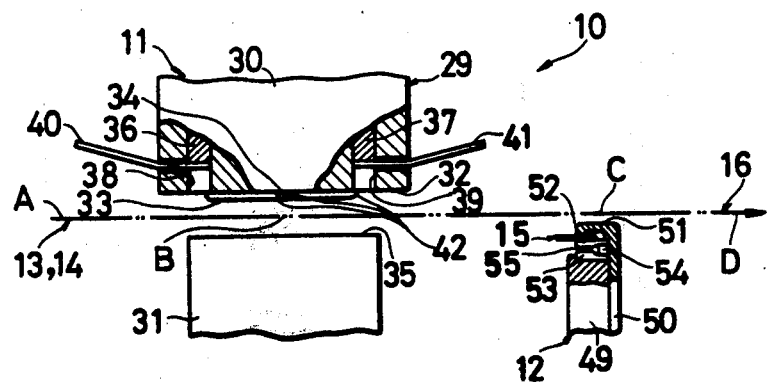
FIG. 1 is a schematic elevational view of an apparatus for reducing to practice a method of manufacturing slide fasteners in accordance with the present invention.

A method according to the present invention is carried out by an apparatus schematically shown in FIG. 1 and generally indicated by the numeral 10. The apparatus 10 basically comprises a centralized processing station 11 and a slider holder 12 disposed downstream of the processing station 11. As a pair of blank slide fastener stringers 13, 14 (better shown in FIG. 2) are fed through the apparatus 10, they are processed at the station 11 and are equipped with a slider 15 supplied from the slider holder 12, thereby producing an individual slider fastener 16 (better shown in FIG. 5).

Figure 2:
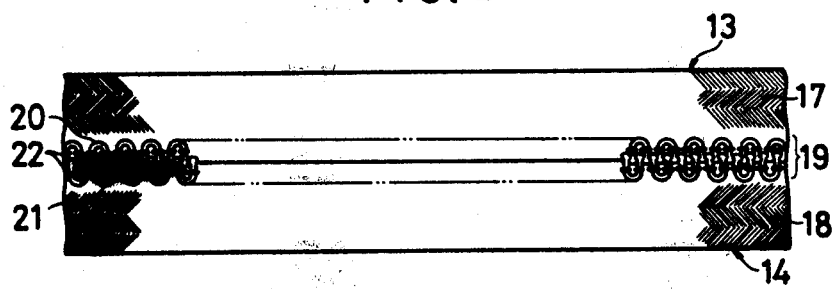
FIG. 2 is an enlarged fragmentary plan view of a pair of blank slide fastener stringers.

FIGS. 2, 3, 4 and 5 illustrate the fastener stringers 13, 14 respectively at the positions A, B, C and D in FIG. 1 while they are being progressively processed into the slide fastener 16. As shown in FIG. 2, the fastener stringers 13, 14 comprise a pair of woven or knitted stringer tapes 17, 18 made up of the thermoplastic synthetic fibers or their blended yarn, and a fastener chain 19 composed of a pair of interengaged rows of fastener elements 20, 21 made of theremoplastic synthetic resin, the rows of fastener elements 20, 21 being sewn with threads 22 including thermoplastic synthetic fibers to the confronting longitudinal edges of the stringer tapes 17, 18. Although the fastener elements 20, 21 are shown as being of the meandering or zigzag type, they may be helically coiled. The slider fastener stringers 13, 14 may be manufactured in the conventional manner. More specifically, the pair of stringer tapes 17, 18 are kept parallel to each other and are advanced longitudinally in one direction, and the pair of intermeshed rows of fastener elements 20, 21 are sewn successively onto the confronting edges of the stringer tapes 17, 18. The slide fastener stringers 13, 14 thus formed are fed intermittently into the station 11 for a distance corresponding to a desired unit fastener length.

Figure 3:
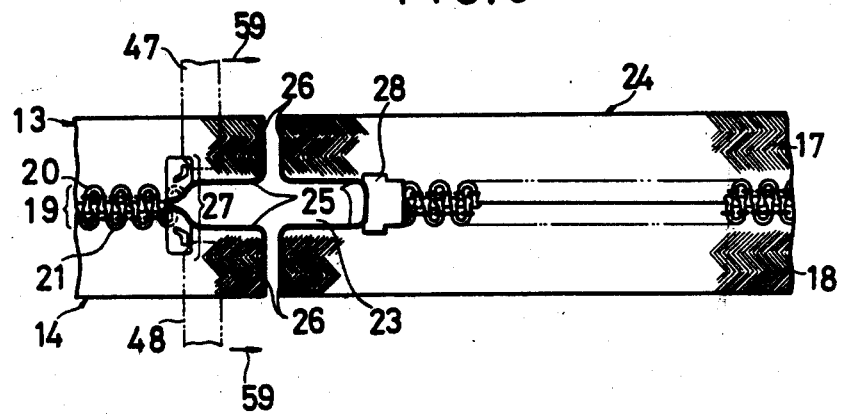
FIGS. 3 and 4 are enlarged plan views respectively showing the fastener stringers progressevely processed in accordance with the invention.

The station 11 centralizes and performs four processing steps simultaneously. In FIG. 3, such concurrent steps comprise producing an element-free gap or space 23 of a substantially rectangular configuration in the fastnner stringers 13, 14, cutting off the fastener stringers 13, 14 substantially centrally across the element-free gap 23 thereby providing an induvidual slide fastener length 24, fusing the edges 25 of the element-free gap 23 and the cut ends 26 of the fastener stringers 13, 14 and of the slide fastener length 24, and forming a top end stop 27 and a bottom end stop 28 respectively on the cut end portions the fastener stringers 13, 14 and of the individual slide fastener length 24. To accomplish such steps, the station 11 includes an ultrasonic processing device 29 generally comprising a fixed anvil 30 and a horn 31 vertically movable toward and away from the fixed anvil 30 as shown in FIG. 1. The anvil 30 has a lower surface 32 facing the horn 31, the lower surface 32 having thereon a looped ridge 33 that corresponds in contour to the element-free gap 23 and a linear ridge 34 extending across and centrally of the looped ridge 33 in a direction that extends substantially transversely to the direction in which the fastener stringers 13, 14 travel. The horn 31 has a flat upper surface 35 for coacting with the ridges 33, 34 on the anvil 30 to produce the element-free gap 23 and to cut off the fastener stringers 13, 14. The anvil 30 contains a pair of first and second punches 36, 37 disposed respectively at the upstream end and the downstream end of the looped ridge 33, the punches 36, 37 being vertically reciprocable respectively in a pair of slots 38, 39 for severing narrow webs 40, 41 of thermoplastic synthetic resin supplied respectively into the slots 38, 39 and then for forcing the severed pieces downwardly through the slots 38, 39 toward the lower surface 32 of the anvil 30 for forming the top end stop 27 and the bottom end stop 28, respectively. Although the narrow webs 40, 41 are shown to be fed along the downstream and upstream directions, they may be supplied into the slots 38, 39 transversely to such directions.

Figure 4:
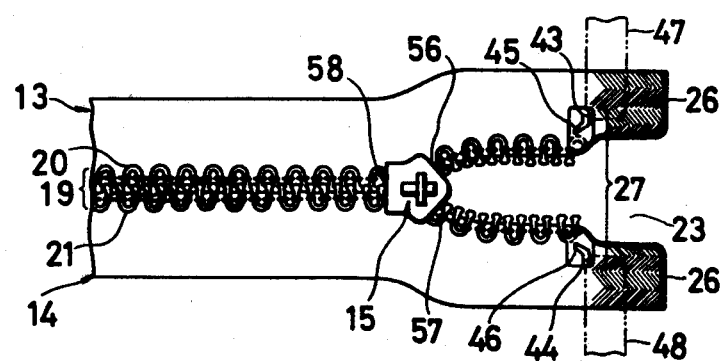
Figure 5:
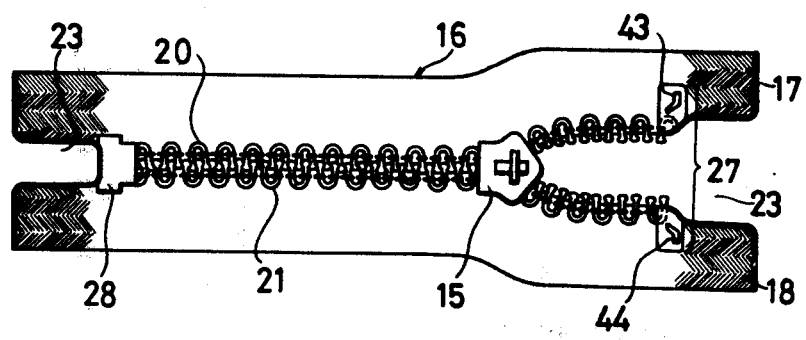
FIG. 5 is an enlarged plan view of a slide fastener that has been complated.

In operation, the horn 31 is raised toward the anvil 30 while the fastener stringers 13, 14 are stopped between intermittent movements thereof. When the upper surface 35 of the horn 31 is held against the ridges 33, 34 on the anvil 30 with the fastener stringers 13,14 interposed in between, the horn 31 is energized to generate ultrasonic vibration, which enables the upper surface 35 to cooperate with the ridges 33, 34 in momentarily abrading those portions of the stringers 13, 14 which are in contact with the ridges 33, 34. The fastener stringers 13, 14 thus are provided with the element-free gap 23 and are cut off as shown in FIG. 3. At the same time, the thermoplastic synthetic resin material at the edges 25 bounding the element-free gap 23 and at the cut ends 26 of the fastener stringer 13, 14 and of the slide fastener length 24 is fused in contact with the surface 42 of the ridges 33, 34 with heat developed by the ultrasonic vibration of the horn 31, the fused synthetic resin material being solidified to prevent fraying of the tape fabric yarn at such cut edges 25 and ends 26. The cut ends of the fastener elements 20, 21 located adjacent to the element-free gap 23 are also fused with the tape fabric against sticking up from the stringer tapes 17, 18. Simultaneously with the formation of the element-free gap 23 and the cutting off of the stringers 13, 14, the piece severed from the narrow web 40 is lowered by the punch 36 until such piece is applied against the fastener stringers 13, 14 near the element-free gap 23. The piece is formed into the top end stop 27 and is fused to the cut end portion of the fastener stringers 13, 14 with heat ultrasonically induced by the horn 31, thereby mounting the top end stop 27 on the fastener stringers 13, 14 as illustrated in FIG. 3. Similarly, the punch 37 forces the cut off piece downwardly until such piece is applied against the slide fastener length 24 near the element-free gap 23. Heat ultrasonically induced by the horn 31 enables the piece to be formed into the bottom end stop 28 and be fused to the cut end portion of the slide fastener length 24, thereby mounting the bottom end stop 28 on the slide fastener length 24. As illustrated in FIGS. 3 through 5, the top end stop 27 is composed of a pair of halves mounted respectively on the stringer tapes 17, 18 in transverse alignment with each other. The top end stop halves include a pair of projections 43, 44 extending away from the plane of the slide fastener stringers 13, 14, the projections 43, 44 having a pair of opposed legs 45, 46, respectively, directed rearwardly away from the cut ends 26 of the fastener stringers 13, 14 diagonally toward a point on the slide fastener chain 19 which is just rearwardly of the element-free gap 23. The pair of legs 45, 46 normally extend in the path of movement of the slider 15 as slid along the slide fastener chain 19.

Then, the slide fastener length 24 is advanced by a grip (not shown), and at the same time the fastener stringers 13, 14 are also advanced by a pair of grips 47, 48 (FIGS. 3 and 4) downstream from the station 11. Each grip 47, 48 grasps the cut end portion of one of the stringer tapes 17, 18 adjacent to the end of the element rows 20, 21.

As shown in FIG. 1, the slider holder 12 includes a base 49 that is vertically or angularly movable, and a support 50 having a hook 51 for holding the slider 15 in place on the base 49, the hook 51 being movable toward and away from the base 49 for clamping and releasing of the slider 15. The slider 15 has a body comprising a pair of upper and lower wings or shields 52, 53 interconnected by a neck or separator diamond 54, the upper and lower wings 52, 53 and the neck 54 jointly providing a Y-shaped guide channel 55 for the passage therethrough of the rows of fastener elements 20, 21. The guide channel 55 has at one end a pair of throats 56, 57 where the element rows 20, 21 emerge from the guide channel 55 in the uncoupled state, and has at the other end a mouth 58 where the element rows 20, 21 enter the guide channel 55 in the coupled state (FIG. 4). The slider 15 is supported on the slider holder 12 with the mouth 58 directed toward the station 11.

When the fastener stringers 13, 14 are moved forwardly by the grips 47, 48 in the direction of the arrows 59 in FIG. 3, the coupled rows of fastener elements 20, 21 are introduced into the slider guide channel 55 through the mouth 58 thereof. The introduction of the element rows 20, 21 into the slider mouth 58 is smooth because the cut ends of the fastener adjacent to the element-free gap 23 are fused and thus positionally stabilized. As the grips 47, 48 travel past the slider 15, they are moved away from each other whereupon the element rows 20, 21 become separated as they go out of the throats 56, 57 of the slider 15 (FIG. 4).

At this time, the legs 45, 46 of the top end stop halves are forcibly flexed or deformed resiliently rearwardly away from each other by the body the slider 15 while the fastener stringers 13, 14 are being advanced, thereby allowing the top end stop 27 to move past the slider 15. As soon as the top end stop 27 goes beyond the slider 15, the legs 45, 46 return to the their original position under resiliency.

When the fastener stringers 13, 14 are stopped again upon completion of their movement for a desired interval corresponding to the unit slide fastener length, the ultrasonic processing device 29 is again energized, thereby producing the slider fastener 16 as shown in FIG. 5 whereupon the installed slider 15 becomes trapped on the slide fastener chain 19.

With this arrangement, since the various processing steps are carried out on the fastener stringers simultaneously at one station and during intermittent movement of the fastener stringers out of such station, the overall manufacturing procedure can be greatly simplified and speeded up, and can be performed on a single apparatus.

Although the preferred embodiment of the present invention has been shown and described, it should be understood that various changes and modifications may be made without departing from the scope of the appended claims.

We claim:

1. A method of manufacturing individual slide fasteners from a pair of continuous slide fastener stringers having a pair of stringer tapes including thermoplastic synthetic fibers and a pair of interengaged rows of fastener elements made of thermoplastic synthetic resin and mounted on and along the confronting edges, respectively, of said stringer tapes, comprising the steps of:
   (a) feeding said fastener stringers intermittently for a distance corresponding to a desired fastener length;
   (b) producing an element-free gap in said fastener stringers by cutting with ultrasonic processing means while said stringers are at rest between intermittent movements;
   (c) simultaneously with the gap producing step, cutting off said fastener stringers across said element-free gap with said ultrasonic processing means, thereby providing an individual slide fastener length and defining the top end boundary of one individual slide fastener and the bottom end boundary of the sequentially adjacent individual slide fastener;
   (d) simultaneously with the gap producing step and the stringers cutting step, fusing the edges of the element-free gap and the cut ends of the fastener stringers and of the slide fastener length with said ultrasonic processing means;
   (e) simultaneously with the gap producing step, forming with said ultrasonic processing means a pair of separated resilient top end stops on respective cut end portions of said fastener stringers associated with said one individual slide fastener, said top end stops each being formed with a configuration that permits each top end stop to pass through a slider upon flexure of said top end stop, and at the same time forming with said ultrasonic processing means a bottom end stop on the cut end portion of said sequentially adjacent individual slide fastener; and
   (f) introducing said interengaged rows of fastener elements on said fastener stringers of said one individual slide fastener into a slider through a mouth thereof with portions of each top end stop being forcibly and resiliently flexed away from each other by the body of said slider while said stringers are being advanced, thereby allowing said top end stops to move past said slider.

* * * * *